Aug. 16, 1960     E. ROHLOFF ET AL     2,949,565
DIRECT CURRENT TO ALTERNATING CURRENT INVERTER
Filed Feb. 5, 1959     2 Sheets-Sheet 1

WITNESSES

INVENTORS
Ebbe Rohloff &
Laszlo Szecsi
BY
ATTORNEY

United States Patent Office 2,949,565
Patented Aug. 16, 1960

2,949,565

DIRECT CURRENT TO ALTERNATING CURRENT INVERTER

Ebbe Rohloff, Nurnberg, and Laszlo Szecsi, Karlsruhe, Germany, assignors to Siemens-Schuckertwerke Aktiengesellschaft, Erlangen, Germany, a corporation of Germany Filed Feb. 5, 1959, Ser. No. 791,324

Claims priority, application Germany Feb. 10, 1958

6 Claims. (Cl. 315—98)

This invention relates to a battery supplied electrical circuit for inverting direct voltage to a higher alternating voltage having a square wave shape; and particularly to a ballast which utilizes a transistorized chopper for converting direct voltage to alternating voltage after which the alternating voltage is stepped up to a higher value having a square wave shape for the efficient operation of fluorescent lamps.

It is known that a longer life and a greater efficiency of fluorescent lamps can be obtained by supplying the individual fluorescent lamps with a square wave lamp current. Heretofore it has been the practice, in order to operate battery fed fluorescent lamps, to convert the battery direct voltage to alternating voltage which is then transformed to a higher value corresponding to the normal alternating voltage used in fluorescent lamps. By incorporating a transistorized chopper in the ballast system thereof, the fluorescent lighting systems incorporated in various types of transportation vehicles, such as railroad cars, buses, and small ships, can be supplied from batteries. Without an increase of the battery supplied direct voltage, the alternating voltage is normally lower than that required for the efficient starting and operating of a fluorescent lamp. The operation of fluorescent lamps on a low voltage supply is not feasible since conventional fluorescent lamps having a standard rated voltage are not designed to operate efficiently at a reduced voltage.

It is, therefore, an object of this invention to provide a novel means for converting battery fed direct current to a square wave alternating current of sufficient voltage to supply fluorescent lamps.

Another object of this invention is to provide a novel transistorized electrical system which supplies a square wave alternating voltage for starting and operating fluorescent lamps.

A further object of this invention is to provide novel means for inverting direct voltage to a square wave alternating voltage.

Still another object of this invention is to provide a new and novel means for inverting direct voltage to a higher alternating voltage.

Another object of this invention is to provide a novel means for inverting direct voltage from a battery fed supply by means of a static chopper and ballast circuit of a fluorescent lamp to a higher peak value of alternating square wave voltage.

These and other objects of this invention will become more apparent upon consideration of the following detailed description of preferred embodiments thereof, when taken in connection with the attached drawings, in which.

Figure 1:
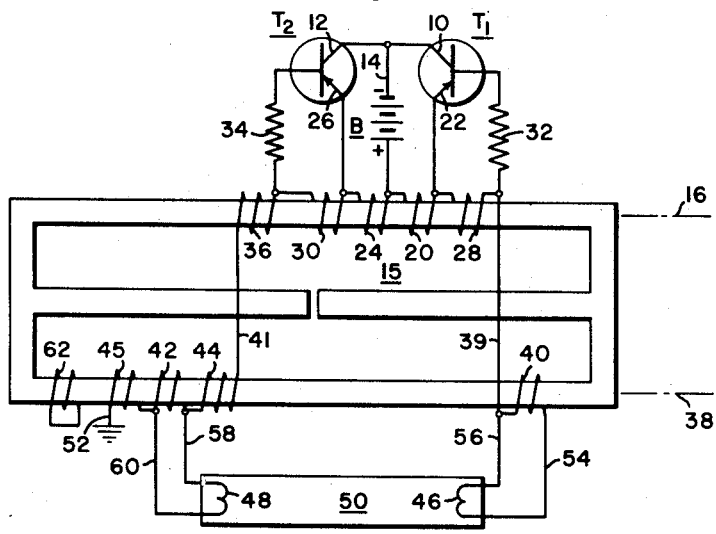
Figure 1 is a schematic view of the electrical circuit for connecting the gaseous discharge device.

Although the inverter is of general utility in applications requiring a square wave supply voltage, the inverter will be described in connection with a supply circuit for gaseous discharge lamps, for purposes of exemplifying the invention. In accordance with specific embodiments of this invention, then, a square wave alternating current is obtained by providing a three legged leakage reactance transformer made of a material having a low magnetic hysteresis loss. One leg of the transformer has an air gap, a second leg of the transformer essentially carries the windings of the chopper circuit, and the third leg of the transformer essentially comprises two individual lamp filament windings. The windings on the third leg are so rated that a current flowing in these windings is phase shifted with respect to the lamp current. A phase shift of the current flowing in the windings of the third leg can be obtained either by placing a corresponding number of ampere turns on the secondary side, for example, by correspondingly proportioning the filament windings; and/or by using an additional coil of a few turns which is short circuited within itself. The leg which has only an air gap and no windings is preferably disposed at the center of the leakage reactance transformer.

Transformer and ballast coils for controlling the operation of a gaseous discharge device, such as a fluorescent lamp, normally are all assembled on a common core structure. While this invention is hereinafter specifically described in connection with the operation of a single gaseous discharge device, it is not limited to a single gaseous discharge device, but can be embodied in the control and operation of a plurality of gaseous discharge devices. As the detailed description proceeds, it will become readily apparent that there are many other applications of these electrical circuits.

Three embodiments of the invention are shown in the accompanying drawings. According to the embodiment shown in Figure 1, the chopper circuit includes two transistors, T1 and T2. The collectors 10 and 12 of transistors T1 and T2, respectively, are connected to the minus pole 14 of the direct current supply battery B. The chopper circuit windings 15, placed on the second leg 16, shown diagrammatically as representing one leg of the autotransformer, comprise on one side an emitter winding 20 disposed between the emitter 22 of transistor T1 and the plus pole of the battery B, and on the other side the emitter winding 24 lying between the plus pole of the battery B and the emitter 26 of the transistor T2. The base windings 28 and 30 of transistors T1 and T2, respectively, are connected in series with emitter windings 20 and 24, respectively, and are connected respectively to the base of each transistor through base resistors 32 and 34. The chopping of the direct voltage of the battery B is done in a manner known per se in the transistor art, for example, as shown in Patent 2,783,384 of Richard L. Bright and George H. Royer entitled "Electrical Inverter Circuits," issued February 26, 1957, and assigned to the present assignee.

An additional winding 36 which is connected in a series additive relationship with the emitter windings 20 and 24 and base windings 28 and 30 to set-up the alternating voltage, is also placed on the second leg 16 of the autotransformer.

The third leg 38 of the autotransformer includes two secondary or filament (heating) windings 40 and 42 which are connected through conductors 39 and 41 to the windings 28 and 36, respectively. A feedback winding 44 which limits the current through the filament winding 42 and an additional secondary or starting-aid winding 45 are connected in series with the filament winding 42.

The filament winding 40, which is connected to one electrode 46 by conductors 54 and 56, is used to energize the electrode 46 of the fluorescent lamp 50, and is conductively connected to the outside end of the base winding 28, as noted previously; while the second filament winding 42, which is connected to electrode 48 by conductors 58 and 60, lies in a series path including both the feedback winding 44, which is connected to the outside end of the additional winding 36, and the starting-aid winding 45. The starting-aid winding 45 is connected by ground connector 52 to a luminaire housing (not shown) to be at the same potential as the luminaire housing to provide a capacitive coupling to aid the starting-aid winding 45 in generating sufficient voltage to start the lamp 50.

The additional winding 36 serves to increase the primary voltage of the transformer to a value sufficient to start the lamp 50 and to ensure the cooperation of the starting-aid winding 45 at a value of the direct supply voltage which is relatively low as compared to the desired alternating voltage for starting the lamp. The feedback or reactance winding 44 functions to limit the lamp current to a prescribed value after the lamp has been started. The feedback winding 44 also operates to increase the no-load voltage across the lamp. During the no-load operation, the voltages across the windings 36 and 44 are additive.

By suitably arranging the filament windings 40 and 42 on the third leg, the number of ampere turns of the transformer can be varied so that a value is obtained which results in a phase shift between the currents passing through these filament windings and the lamp current, such that a resultant, substantially rectangular current is obtained. In order to support further this phase shift, an additional short-circuited-winding 62 having a relatively few turns can be placed on the third leg of the transformer, as a short-circuited-winding 62 placed by itself on the third leg 38 of the autotransformer 15 will enhance a square wave form for the lamp current.

Figure 2:
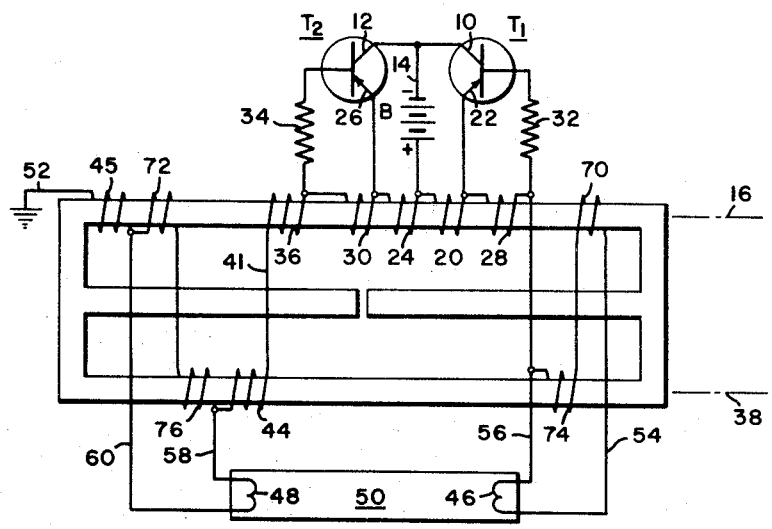
Figure 2 is a schematic view of the electrical circuit showing a modified arrangement of the electrical circuit shown in Figure 1.

Figure 2 shows a modified arrangement of that shown in Figure 1. Parts which are identical in both figures are given similar reference characters.

With the embodiment shown in Figure 2, the low alternating voltage obtained can be brought to a higher value than that obtained with the system shown in Figure 1 by dividing each winding supplying the two filament windings 46 and 48, into a primary section 70 and 72, respectively, and a secondary section 74 and 76, respectively, said sections being connected in series relationship in the respective filament circuits. In this manner the transformer permits reliable starting and operating of fluorescent lamps supplied by low-voltage sources of direct current. The starting-aid winding 45 is arranged here on the second leg 16 in series with the primary section 72 of the one filament winding 48, and is additive to increase the lamp potential.

Figure 3:
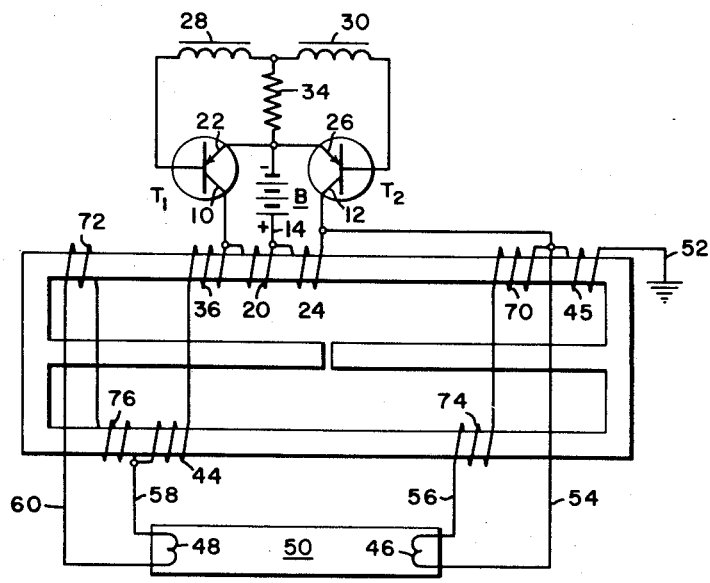
Figure 3 is a schematic view of the electrical circuit similar to the electrical circuit shown in Figure 2 but in which only one resistor is needed in the chopper circuit.

The Figure 3 arrangement differs from that of Figure 2 in that it shows another arrangement of the chopper part of the circuit, which other arrangement has the advantage that it requires only one base resistance 70. The number of ampere turns required to effect the square wave form of the lamp current is determined by the rating of the two secondary sections 74 and 76.

The chopper circuit, therefore effects a conversion of the direct voltage supplied by battery B into an alternating voltage which, in turn, is stepped up to a value corresponding to that required for the lamp by the leakage reactance transformer connected as an autotransformer as shown in Fig. 1 or 2 or Fig. 3, respectively. These arrangements embodying the invention make it possible to produce in a simple manner, a square wave output voltage, particularly adaptable for supplying gaseous discharge lamps as noted above, and they afford the additional advantages of imposing only a small load on the transistors and of protecting the latter from short circuits which may be encountered in use. Furthermore, in the case of the aforementioned lamps, the inverter circuit provides suitable ballast for the lamp.

Since numerous changes can be made in the above described construction, and different embodiments of the invention can be made without departing from the spirit and scope thereof, it is intended that all matter contained in the foregoing description or shown in the accompanying drawings shall be interpreted as illustrative and not in a limiting sense.

We claim as our invention:

1. In a direct current to alternating current inversion system comprising, a direct current supply, a transformer, means for chopping the direct current voltage to alternating current, low voltage windings on a portion of the core of said transformer, a high voltage winding connected in series with one of said low voltage windings, the number of turns of said low voltage windings being so proportioned on said core as to produce a phase shift of the currents passing through the low voltage windings relative to the alternating current output.

2. A direct current to alternating current inversion system for a fluorescent light comprising, a direct current supply, a transformer having a three legged core a transistor means for chopping the direct current to alternating current, emitter windings and base windings for said transistor means located on one leg of the core of said transformer, an air gap in the second leg, lamp filament windings connected in series with the emitter and base windings, respectively, a starting-aid winding connected in series with said lamp filament windings, the number of turns of said filament windings being so proportioned on said third leg to produce a phase shift of currents passing through the filament windings relative to the current passing through the gaseous discharge lamp.

3. A direct current to alternating current inversion system for a fluorescent lamp comprising, a direct current supply, a transformer having a three legged core, a transistor means having chopper windings coupled with one leg of said core for chopping the direct current to alternating current, a booster winding on said one leg of said core connected in series with said chopper windings, an air gap in a second leg of said core, lamp filament windings connected in series with said booster winding and located on a third leg of said core, a current limiting winding connected in series with said lamp filament windings and located on said third leg of said core, a starting-aid winding connected in series with said current limiting winding and located on said third leg of said core, and said starting-aid winding capacitively coupled to ground, the currents in said filament windings being phase shifted relative to the current through said current limiting winding so that the last mentioned current has a substantially square wave form.

4. A direct current to alternating current inversion system for a fluorescent lamp comprising, a direct current supply, an autotransformer having a three legged core, a transistor means having its chopper windings located on one leg of said core for chopping the direct current to alternating current, a booster winding connected in series with said chopper winding and located on the same leg of said core, an air gap located in the second leg of said core, split lamp filament windings connected in series with said booster winding, a primary section of said lamp filament windings disposed on the first leg of said core, a secondary section of said lamp filament windings disposed on the third leg of said core, a starting-aid winding located on said first leg of said core connected in series with said primary section of said lamp filament windings and capacitively coupled to a ground, the filament secondary sections producing a phase shift of the currents passing through the filament windings relative to the current through said lamp.

5. A direct current to alternating current inversion system for a fluorescent lamp comprising, a unidirectional supply, a transformer having a three legged core, a transistor means closely coupled with one leg of said core for chopping the direct current to alternating current, lamp filament windings on a second leg of said core, a starting-aid winding connected in series with one of said lamp filament windings and located on said second leg of said core, the number of turns of said filament windings proportioned on said second leg to produce a phase shift of the currents passing through the filament windings relative to the lamp current, a separate short circuited winding disposed on said second leg of said core for amplifying the phase shift whereby a substantially square wave current is produced through said lamp.

6. A direct current to alternating current inversion system comprising, a unidirectional supply, means for chopping the unidirectional current to alternating current, a transformer for stepping up the alternating current, windings on said transformer having their turns proportioned so as to induce a phase shift in the current of said windings relative to the output current of said system so that said output current is provided with a substantially square wave form.

References Cited in the file of this patent

UNITED STATES PATENTS

| | | |
|---|---|---|
| 2,783,384 | Bright et al. | Feb. 26, 1957 |
| 2,830,232 | Carpenter et al. | Apr. 8, 1958 |
| 2,849,614 | Royer et al. | Aug. 26, 1958 |
| 2,858,478 | Kershaw | Oct. 28, 1958 |

FOREIGN PATENTS

| | | |
|---|---|---|
| 1,123,405 | France | June 11, 1956 |